Patented Nov. 13, 1934

1,980,428

UNITED STATES PATENT OFFICE 1,980,428

TREATMENT OF MATERIALS MADE OF OR CONTAINING CELLULOSE OR CELLULOSE DERIVATIVES

Reginald Henry Parkinson, Spondon, near Derby, England, assignor to Celanese Corporation of America, a corporation of Delaware No Drawing. Application October 15, 1930, Serial No. 488,998. In Great Britain November 6, 1929

2 Claims. (Cl. 28—1)

This invention relates to the treatment of artificial filaments, threads, yarns, ribbons, fabrics, films or other materials made of or containing cellulose acetate or other cellulose esters or natural or artificial materials made of or containing cellulose.

The invention is more particularly concerned with processes for the treatment of such materials so as to introduce therein inorganic substances. The principal object of the invention is to introduce into artificial materials inorganic substances for the purpose of reducing or subduing, or otherwise modifying the lustre thereof, or for the purpose of weighting the same, or for the purpose of increasing the resistance of the materials to heat treatments such as ironing. This latter object comes into question more particularly in the case of materials made of or containing cellulose esters or ethers.

For any of the above purposes it is desirable that the inorganic substance or substances introduced shall be white or substantially white, or as light coloured as possible, since obviously it is desirable to be able to colour such materials in any desired shade.

According to the present invention the materials made of or containing cellulose or cellulose esters or ethers are treated with suspensions, dispersions or colloidal solutions of the desired inorganic substances. The substances employed may vary very widely and may vary according to the nature of the material treated or the object with which the inorganic substance is introduced. White or substantially white metallic oxides are particularly valuable. The following are some examples of inorganic substances which may be introduced, but it is to be understood that the listing of these examples implies no limitation of the invention thereto:—oxides of aluminium, titanium, tin, tungsten, silicon, zinc, lead, uranium, cerium etc., barium carbonate, barium sulphate, zinc sulphide, china clay, bentonite or other substantially white and insoluble silicates and kieselguhr. Preferably the substances introduced into the materials are insoluble or substantially insoluble in water so that upon subsequent processing of the fabrics or other materials no substantial diminution of their content of inorganic material is produced. The medium in which the dispersions, suspensions or colloidal solutions of the inorganic materials are applied is preferably water, but any other suitable medium, for example alcohols, may be used.

It is remarkable that materials made of or containing cellulose esters or ethers should be capable of absorbing inorganic substances from a suspension, dispersion or colloidal solution thereof, particularly when it is considered that such materials will not absorb metallic radicles from true solution, unless they are previously or simultaneously brought into a swollen condition. Swelling agents may be used in the processes of the present invention to accelerate the absorption.

The suspensions, dispersions or colloidal solutions for use according to the present invention may be produced by any suitable process. Mechanical disintegration in the presence of the dispersion medium and with or without dispersators or protective colloids is very suitable. Chemical methods involving the formation of the inorganic substances in the dispersion medium may also be employed, such formation taking place, if desired or necessary, in the presence of protective colloids. Thus, for example, a salt containing a metal whose oxide is desired in colloidal solution may be treated so as to remove a radicle of the salt leaving the oxide. For instance a salt of aluminium may be dialyzed to remove the acid radicle, or alternatively a salt containing a volatile acid radicle, for example aluminium acetate, may be boiled so as to remove the acetate radicle and obtain the alumina in colloidal form. Again, the already formed inorganic substances may be peptized with the aid of suitable agents, for instance acids, alkalies or salts. Thus for example alumina, stannic oxide or titanium oxide may be peptized with the aid of dilute mineral acids, for instance dilute hydrochloric or dilute nitric acid.

In many cases a simple treatment of the fibres or other materials in the cold with the dispersion, suspension or colloidal solution is sufficient to bring about an appreciable absorption of the inorganic material particularly if the electric charge of the dispersed or suspended particles is opposite in sign to that of the material under treatment. A colloidal solution of titanium oxide obtained by peptizing the oxide with dilute mineral acids is thus very suitable for direct treatment of cellulose acetate materials since the particles of titanium oxide are positively charged. The sign of the dispersed or suspended particles may where desirable, be changed by any suitable means; for instance in the case of silica suspensions or dispersions, upon adding sodium silicate to a slight excess of dilute hydrochloric acid or other mineral acid, a negative sol is first produced which upon addition of hydrochloric acid or other mineral acid changes first to zero and then to a positive sol. The absorption by the materials under treatment of the inorganic substance or substances, whether the latter have a charge of opposite sign to that of the materials or not, may be accelerated or even initiated by any suitable means, for instance by heating, by electrical means or by any means which will bring about a slow coagulation or breaking of the dispersion or colloidal solution. With this latter object, the addition of electrolytes, and especially electrolytes containing di-, tri-, or polyvalent ions is particularly valuable. The coagulant should be such that coagulation in the absence of the fibre or material is relatively slow. The coagulant may be added to the colloidal solution or dispersion before introduction of the fibre or at any suitable stage subsequent thereto or alternatively the fibre or material may be separately treated with a coagulant after treatment with the colloidal solution dispersion or the like.

As indicated above, the absorptive power of the materials for the suspended, dispersed, or colloidally dissolved particles may be increased by previous or simultaneous treatment with a swelling agent. For instance cellulose acetate or other cellulose ester or ether may be treated with thiocyanates, acetic acid, lactic acid or like organic acids, aromatic sulphonic acids, phenols etc., before or during the treatment with the colloidal solutions, dispersions or suspensions. In some cases in treating the material simultaneously with a swelling agent and the colloidal solution, suspension or dispersion, the swelling agent may perform the double function of swelling the fibre and at the same time effecting a slow coagulation of the particles of the dispersion. For instance sulphonic acids have the property of swelling cellulose esters, while at the same time they are capable of coagulating many colloidal solutions.

The temperature of the treatment may vary considerably, for example from ordinary atmospheric temperature or lower to 60 to 70 or 80° C. or higher. In the case of cellulose acetate or like fibres, temperatures above about 85° C. should be avoided in the case of aqueous reagents unless delustering by these aqueous reagents is required, or unless sugars, salts or other agents adapted to prevent the delustering are present. Salts for this purpose should be used with care as in many cases they may bring about too rapid a coagulation of the suspensions or dispersions.

The colloidal solutions, dispersions or suspensions of the inorganic substances may be applied to the materials in any desired manner. Bath, spraying or padding treatments, i. e. treatments by mechanical impregnation, are in most cases very suitable where it is desired to introduce the inorganic substances uniformly into the materials. For local application spraying, printing or stencilling may be employed. The colloidal solutions, dispersions or suspensions may be thickened with any suitable thickening agents, for instance those well known in the printing arts, for application by printing methods. The local application of the inorganic substances according to the present invention is very valuable from the point of view of producing materials of differential lustre. A printing paste containing a suspension, dispersion or colloidal solution of titanium oxide or other lustre reducing or modifying agent may for example be locally applied to the artificial material to produce a subdued lustre upon a ground of normal lustre.

The concentration of the inorganic substances in the colloidal solutions may vary widely with the particular inorganic substance employed, with the purpose for which it is applied and with the nature of the material under treatment. For instance, colloidal solutions containing 1 to 5% or less may be used for some purposes, while suspensions or dispersions containing 5 to 10% or even up to 50% of the dispersed substance may be used in the case of requiring a weighting of the material under treatment, or in the case of increasing its resistance to heat treatment. Similarly, the actual amount of substance to be absorbed may vary considerably with the object to be achieved and also with the nature of the inorganic substances applied. In the case of reducing or subduing the lustre, proportions of inorganic substance of the order of 0.5 to 2% on the fabric or material under treatment is sufficient, though higher proportions may be used, while for increasing the heat resistance of materials or for weighting purposes, much higher proportions of inorganic substances may be introduced.

As already indicated, the processes of the invention are particularly applicable to the treatment of materials made of or containing cellulose esters or ethers, for example cellulose acetate, cellulose fomate, cellulose propionate, cellulose butyrate, "immunized cotton", methyl cellulose, ethyl cellulose or benzyl cellulose, since in general it is difficult to introduce metallic radicles into these materials without swelling and consequent temporary tendering. The invention is however also of value in the treatment of materials made of or containing cellulose or reconstituted cellulose, e. g. cotton or materials made from viscose, cuprammonium solutions of cellulose or nitrocellulose. Mixed materials containing cellulose esters or ethers and/or cellulose including reconstituted cellulose in admixture with other fibres, for instance silk or wool, may likewise be treated.

The following examples show the best methods known to me for carrying the invention into effect, but they are not to be considered as limiting it in any way:—

*Example 1*

A solution of titanium sulphate containing about 5% $TiO_2$ is well cooled by adding ice and a cool 5% solution of caustic soda run in slowly with thorough stirring until the liquor is just alkaline, the temperature being kept low, for example under 5° C., during the addition. The precipitated hydroxide is separated from the liquor and thoroughly washed using several changes of water. It is then drained or pressed off until a paste is obtained containing about 20% of $TiO_2$. To this paste concentrated hydrochloric acid is added to the extent of 1 to 2% of HCl on the weight of the $TiO_2$, the addition being carried out with thorough stirring. The whole is then heated to a temperature of 80 to 100° C. when it gelatinizes and may become translucent. If desired or requisite, a further quantity of hydrochloric acid may be added to facilitate dispersion. The dispersed mass is then diluted with water to give a sol containing about 5% of $TiO_2$. Into the bath thus obtained cellulose acetate yarn or fabric or a cotton or viscose yarn or fabric is entered, for example into a bath six times the weight of the goods. The goods are treated in the bath at a temperature of about 60° C. for 10 minutes to half an hour, or until the required quantity of titanium oxide has been absorbed. The goods are then lifted and washed.

Local application may be obtained by spraying the above sol on to the fabric through suitable stencils or alternatively the sol or a somewhat more concentrated sol may be thickened and applied by printing methods.

Example 2

An alumina sol is prepared in the manner described in Example 1, but using aluminium sulphate instead of titanium sulphate. The goods are entered, as described in Example 1, into a bath containing about 4 to 8 per cent of dispersed $Al_2O_3$ and treated therein at a temperature of 50 to 70° C. until the required absorption is obtained. Local effects may be obtained as described in Example 1.

Example 3

A solution of aluminium chloride containing about 22.5 grams $Al_2O_3$ per litre is precipitated with ammonia solution, the precipitate washed and covered with about 200 times its weight of water. The whole is then brought to the boil and a quantity of N/20 hydrochloric acid added gradually, equal to about $\frac{1}{10}$ of the volume of liquor present. The goods are then entered into the bath as described in Example 2 and treated therein until the required absorption of $Al_2O_3$ is obtained.

Example 4

A padding solution is made up as follows:—

400 parts bentonite
100 parts methylated spirit
50 parts 50% gum arabic solution
25 parts phenol or diethylene glycol or a mixture thereof
425 parts water A cellulose acetate fabric is padded with the above solution, the fabric then steamed for one hour at the steam pressure of 5 lbs., soaked for 20 minutes at 16° C. with a soap solution containing 2.5 grams per litre, and the fabric finally rinsed and dried.

In a similar manner a printing paste may be made up with the above constituents and a fabric, either cover pad printed therewith (i. e. printed all over), or printed locally. In this manner a fabric of uniformly low lustre is obtained or a fabric showing a pattern of low lustre on a ground of normal lustre.

What I claim and desire to secure by Letters Patent is:—

1. Process for reducing the lustre of materials comprising cellulose acetate, comprising applying thereto a colloidal solution of aluminium oxide.

2. Process for reducing the lustre of materials comprising cellulose acetate, comprising applying thereto a colloidal solution of aluminium oxide in presence of a swelling agent for cellulose acetate.

REGINALD HENRY PARKINSON.